United States Patent

[11] 3,615,662

| [72] | Inventors | Rudolph H. Ellinger<br>New Canaan, Conn.;<br>Mark G. Schwartz, Yonkers, N.Y. |
|---|---|---|
| [21] | Appl. No. | 744,679 |
| [22] | Filed | July 15, 1968 |
| [45] | Patented | Oct. 26, 1971 |
| [73] | Assignee | Stauffer Chemical Company<br>New York, N.Y. |

[54] REPLACEMENT OF SODIUM CASEINATE
21 Claims, No Drawings

[52] U.S. Cl. .................................................. 99/54,
99/57, 99/63, 99/65, 99/115, 99/136, 99/139
[51] Int. Cl. ........................................... A23c 13/12,
A23c 19/12
[50] Field of Search............................................ 99/54, 57,
63, 94, 139, 136, 65; 681/556

[56] References Cited
UNITED STATES PATENTS
2,923,628  2/1960  Otto .............................. 99/63
3,201,245  8/1965  Clark et al. .................... 99/57
3,269,843  8/1966  McKee et al. .................. 99/94

OTHER REFERENCES

Webb et al., The Utilization of Whey: A Review. J. Da. Sci. Vol. 31 No. 2 Feb., 1948 (pages 154– 157) SF221J8.

*Primary Examiner*—Lionel M. Shapiro
*Assistant Examiner*—D. M. Naff
*Attorneys*—Paul J. Juettner, Wayne C. Jaeschke and Martin Goldwasser ABSTRACT: Compositions of demineralized dry whey solids and either monosodium phosphate or insoluble metaphosphate are provided which exhibit functional properties in food compositions as well as nutrient value. The phosphate is present in an amount of at least one percent based on protein. The demineralized dry whey solids contain no more than 5.0 percent by weight of whey minerals. These compositions are preferably used as replacement, total or partial, for sodium caseinate in nonbutterfat dairy products.

REPLACEMENT OF SODIUM CASEINATE

This invention relates to compositions of dry whey solids and either monosodium or insoluble metaphosphate (IMP). More particularly, this invention relates to dry mixtures of demineralized whey solids and the aforesaid certain phosphate salts which impart desirable functional properties to whey thereby permitting its use in food applications where it was heretofore unsuitable.

The compositions of this invention are useful in various food compositions particularly those containing fat. Areas of particular utility include both liquid and powdered coffee whiteners, whipped toppings, filled milk, imitation milk, and the like.

As a byproduct of cheese production, whey has long been discarded as waste. In recent times, world-wide shortages of protein have directed a considerable effort to the recovery of whey protein as a food source. While a relatively small proportion of whey is utilized in animal feed, and a proportion is dried and utilized for human consumption, a large proportion of whey is still discarded as waste. This has resulted not only in a loss of recoverable protein as a food source but has also contributed to the pollution of many streams, lakes and rivers.

The very composition of whey has historically mitigated against its use as a food source. Whey contains only from about 5 to about 10 percent solids, the remainder being water. Thus, to even produce dry whey solids, a disproportionately large amount of water must be removed. Large scale drying techniques have in recent years been developed, however, which make the production of dry whey solids both technically possible and economically feasible. A very large proportion of the dried whey produced, however, still is utilized as animal feed. Utilization of dried whey in food compositions for human consumption has not proved feasible because of the functional deficiencies inherent in the dry whey solids themselves.

One particular food area where the use of whey has proven functionally deficient is in nonbutterfat containing dairy product compositions such as the coffee whiteners, whipped toppings, and the like. While such products could theoretically utilize dry whey solids, they have been found functionally deficient. Dry whey used in nonbutterfat coffee whitener compositions, for example, results in products which exhibit oil separation, and feathering in hot coffee. While this is nutritionally unimportant, it is aesthetically unacceptable. Liquid coffee whiteners utilizing dried whey exhibit not only the foregoing deficiencies but additionally are subject to phase separation which again is also unacceptable from a market standpoint.

Accordingly, it is believed that the present invention which overcomes the inherent problems in the use of dry whey solids in food applications represents a considerable advance in the art which could effect the utilization of unused protein and consequently reduce somewhat the pollution of the streams and rivers into which the greater portion of liquid whey is conveniently discharged as waste.

In accordance with the present invention, demineralized dry whey solids containing from about 1 to about 5percent by weight total of the naturally occurring whey minerals have been found to be functionally suitable for use in nonbutterfat dairy products by simple admixture with at least one percent by weight based upon whey protein of particulate monosodium phosphate or insoluble metaphosphate.

Monosodium phosphate can be represented by the formula: $NaH_2PO_4$

Insoluble metaphosphate is also well known in the art and is similarly commercially available.

Whole liquid whey is the liquid normally obtained from the manufacture of cheese. This liquid is residual from the milk after the formation and removal of the curds. The whole liquid whey contains soluble protein, principally lactoglobulin and lactalbumin, soluble salts or minerals of the milk, fat, lactose and a large amount of water. While the composition of whole liquid whey will vary somewhat in respect to the particular cheese making process from which it is derived, the following approximate composition of whole liquid whey is illustrative and generally representative.

| Constitutent | Approximate Percent by Weight |
| --- | --- |
| Water | 93.2 |
| Protein | 0.9 |
| Lactose | 5.1 |
| Fat | 0.3 |
| Minerals | 0.5 |

Whole liquid whey generally contains approximately 7 percent by weight solids. The whole whey solids are obtained by removing water from the whole liquid whey. This drying operation can be effected by several processes. For example, the whole liquid whey can be dried directly by conventional techniques to provide whole dry whey solids or prior to drying some or all of the nonprotein components can be removed.

Dry whey solids has the approximate composition which is illustrative and generally representative.

| | Percent by Weight |
| --- | --- |
| Protein | 12.5 |
| Fat | 1.0 |
| Moisture | 4.5 |
| Ash (mineral content) | 9.0 |
| Lactose | 73.0 |

By demineralized whey is meant whole whey from which all or a portion of the naturally occurring mineral content of the whey has been removed. For purposes of this invention, demineralized dry whey is meant dry whey having a mineral content no greater than 5.0 percent by weight based upon the total dry whey composition. Dry whey compositions containing no minerals can, or course, be used, although this is not usually practical. Dry whey compositions containing from about 1.0 to about 5.0 percent and preferably from about 2.0 to about 4.0 percent are obtainable without great difficulty and are effective in the conduct of this invention.

Whey can be effectively demineralized as whole liquid by techniques known to the art. For example, electrodialysis techniques can be employed or dialysis techniques, to produce demineralized liquid whey which is thereafter dried by conventional techniques such as spray drying to produce demineralized dry whey. Of course, the liquid whey should be demineralized to the extent necessary to provide a dry whey composition containing not more than 5 percent by weight minerals as indicated for use in this invention.

It is an important feature of this invention that demineralized dry whey can be used containing all the other solid components of the liquid whole whey to 100 percent dry whey protein. Accordingly, it is intended that for purposes of this invention dry whey solids include dry whey containing up to 100 percent whey protein. Whole dry whey generally contains at least 5 percent by weight and usually about 12 percent by weight whey protein but this amount can vary depending on such factors as the milk source, the cheese process, and the like. Supplemental protein can, of course, be added, if desired.

The amount of monosodium phosphate or insoluble metaphosphate utilized given the demineralized whey composition of this invention will vary slightly depending upon the particular dry whey solids employed and the particular recipe in which they are to be used. In general, however, amounts of at least 1.0 percent based on the percent whey protein are satisfactory, although it is preferred that amounts from about 10 percent to about 40 percent be used and most preferred that amounts from about 25.0 to about 35 percent be used. Slight adjustment well within the skill of the art may be desireable to achieve optimum performance in any given formulation.

Ratios of 5:1 protein to phosphate by weight to ratios of 3:1 are preferred based on economic consideration and optimum effectiveness, although higher and lower ratios can be employed.

The demineralized whey-phosphate compositions of this invention are formed by the simple admixture of the component ingredients. It is, of course, desired that these mixtures be thoroughly blended to provide a uniform mixture. Any conventional blender or mixer suitable for blending dry powders can be used provided, of course, they meet the general requirements of food processing.

In respect to particle size of the demineralized whey-phosphate mixture, when using IMP is should have maximum particle size of 44 microns; otherwise, there are no critical requirements, although it is desirable that the phosphate and whey particles be of relatively similar size to avoid gravity separation in transit. While larger particle sizes of IMP can be employed, if desired, it can be gritty if sizes larger than 44 microns are used. A whey-phosphate mixture having particle sizes of from about 8 mesh to about 125 mesh has been found to be quite suitable, although larger and smaller particle sizes can be employed, if desired. As noted above, however, in respect to the insoluble metaphosphate, is preferred to employ a 325 mesh or smaller particle size.

The mixtures of this invention, as indicated above, are useful in nonbutterfat dairy products and it has been found that they are particularly useful in those areas wherein sodium caseinate has been heretofore used. The mixtures of this invention serve effectively as a replacement for sodium caseinate on equal protein basis in the whole or in part.

Sodium caseinate formed by the alkali neutralization of casein has found broad utility in nonbutterfat dairy products. Sodium caseinate is conventionally used in such food compositions as coffee whiteners, whipped toppings, mellorines, frozen desserts, pudding, custards, frozen cream pies, process cheese, imitation sour creams, snack dips, baby foods, instant breakfasts, filled milk, imitation milk, and the like. While sodium caseinate generally serves a specific function in these compositions, it simultaneously serves as a nutrient additive. The mixtures of this invention can effectively replace sodium caseinate in all such food compositions although they are particularly effective in coffee whitener compositions and whipped toppings. The importance of this discovery is enhanced by the fact that the availability of whole milk and whole milk products such as casein is dwindling with increase in population, and that dry whey as recovered from waste whey has in instances in the past been unsuitable for use in such food composition. The unsuitability of dried whey in such compositions was believed due to the partial denaturation of the protein and the large amounts of lactose present adversely affecting the functional properties of the material. The amount of the compositions of this invention used in any of the nonbutterfat dairy product compositions will vary with the amount of sodium caseinate normally used in such compositions and whether or not the sodium caseinate is partially or wholly replaced by the compositions of this invention. In any given composition, however, the compositions of this invention replace sodium caseinate on a protein basis from 50 to 100 percent based on the amount of protein available in the whey-phosphate compositions. Sodium caseinate is normally used in food compositions in an amount of from 0.5 to about 20 percent, although higher amounts can be used, if desired.

The mixtures of this composition can also be used with sodium caseinate in these food compositions in a ratio of from about 0.1 to about 100 parts by weight of the mixture of this invention to from about 99.9 to about 0 parts of sodium caseinate.

Sodium caseinate serves one or more functions in various food compositions containing it. For example, in compositions containing fat or oil and water, this ingredient serves to encapsulate the oil droplets and bind water, thus stabilizing the composition and preventing separation of oil and water from the food composition. In compositions where air is blended or beaten into the mixture, sodium caseinate serves to further bind the air bubbles to the encapsulated oil or fat and water, and thus stabilize the foam, i.e., the air, water, fat system. It similarly serves to prevent or inhibit churning in certain applications.

It has been further found that in addition to replacing sodium caseinate in such food compositions per function, compositions of this invention provide to the food composition similar nutritive values based upon essential amino acid composition. This can be seen from Table 1 following where the approximate respective constituents of amino acid, dried whey, casein, lactalbumin, lactoglobulin and whey phosphate are set forth. While the compositions of this invention are well suited to the nonbutterfat dairy product compositions, they can be effectively employed in any food composition, as, for example, in process cheese composition.

The phosphate demineralized whey compositions of this invention are generally employed in food compositions in an amount of from about 0.05 to about 15 percent by weight, although, as indicated above, the specific amount will vary somewhat from recipe to recipe and formulation to formulation.

When used in an emulsified type food such as coffee whitener or whipped topping, the whey-phosphate compositions should be employed in an amount sufficient to provide at least 0.3 percent by weight protein to the total product in respect to demineralized whey.

TABLE I.—ESSENTIAL AMINO ACID CONTENT OF PROTEINS

[Grams/100 grams of protein]

| | Arginine | Histidine | Isoleucine | Leucine | Lysine | Methionine | Phenylalanine | Threonine | Valine | Tryptophan | tyrosine |
|---|---|---|---|---|---|---|---|---|---|---|---|
| Casein | 4.10 | 3.02 | 6.6 | 10.55 | 8.60 | 3.17 | 5.72 | 4.46 | 8.24 | 1.17 | 5.64 |
| Milk, lactalbumin | 4.00 | 2.30 | 7.50 | 12.10 | 10.50 | 2.60 | 5.00 | 6.00 | 6.60 | 2.50 | 5.30 |
| Milk, lactoglobulin | 2.90 | 1.60 | 6.80 | 15.50 | 11.30 | 3.20 | 3.70 | 5.30 | 5.88 | 1.90 | 3.70 |
| Milk, dried whey | 2.06 | 1.18 | 5.54 | 9.10 | 7.48 | 1.00 | 2.43 | 4.86 | 4.49 | 1.06 | 1.99 |

As indicated above, the compositions of this invention are directed primarily to utilization in nonbutterfat dairy products. Certain of these nonbutterfat dairy products are described in detail hereinafter. For convenience, sodium caseinate has been used as an illustrative component. It is understood, however, that the composition of this invention serves as total or partial replacement for this ingredient and substitution serves as example.

Coffee Whiteners

Coffee whiteners have been on the market for several years and have proven to be an effective substitute for whole milk and cream in coffee. Two types of coffee whiteners have been marketed: the dry and liquid form. These products have the advantage that they are less expensive than the corresponding natural dairy product. The dry form is particularly advantageous in that it requires no refrigeration, and reduces risk of spoilage. For these reasons, coffee whiteners have received a popular reception in such market areas as offices and picnic and company supplies where refrigeration is not available or where risk of spoilage is a problem. Sodium caseinate is commonly used in coffee whiteners to encapsulate the fat or oil droplets, the preventing separation of the fat and coalescence of the droplets to form fat lakes on the surface of hot coffee. As is well known, cream often separates on the surface of hot coffee forming globules of butterfat. Thus, when properly formulated and manufactured, coffee whiteners are often superior in stability to cream.

Sodium caseinate is generally used in dry coffee whiteners in amounts of from about 5 to about 10 percent on the total composition.

Set forth below are typical coffee whitener formulations with a range of ingredients given for each. One of these formulations is for a liquid-type coffee whitener, the other for a dry type.

In the example below, the control formulation is a typical formula for coffee whiteners containing sodium caseinate.

Coffee Whiteners, Liquid

| Ingredients | % (Range) |
|---|---|
| Sodium caseinate or | 0.5–5.0 |
| Phosphate-Demineralized whey mixture | 1.0–10.0 |
| Corn syrup solids | 7.5–15.0 |
| (Adjusted for phosphate-whey mixture) | 6.0–12.0 |
| Vegetable shortening | 7.5–15.0 |
| Dipotassium phosphate | 0.5–1.5 |
| Stabilizer and emulsifiers | 0.0–5.0 |
| Flavoring | As needed |
| Water | To bring to 100% |

Coffee Whiteners, Dry

| Ingredients | % (Range) |
|---|---|
| Sodium caseinate or | 5.0–10.0 |
| Phosphate-demineralized whey mixture | 10.0–20.0 |
| Vegetable shortening | 35.0–50.0 |
| Corn syrup solids | 35.0–50.0 |
| (Adjusted for phosphate-whey mixture) | 25.0–38.0 |
| Emulsifiers and stabilizers | 0.0–5.0 |
| Dipotassium phosphate | 0.5–3.0 |
| flavoring | As needed |

In the foregoing formulations, demineralized whey-phosphate mixtures can be used to replace the sodium caseinate in whole or in part.

Two typical type formulations for coffee whiteners utilizing dry whey-phosphate mixtures are set forth below:

Dry Whey-phosphate Replacement of Sodium Caseinate

Coffee Whitener (liquid)

| Ingredient | Percent |
|---|---|
| Phosphate-demineralized whey mixture | 4.18 |
| Corn syrup solids | 8.60 |
| Dipotassium phosphate | 1.00 |
| Vegetable shortening | 10.00 |
| Stabilizer and emulsifier | 0.40 |
| Water | Balance |

Coffee Whitener (dry)

| Ingredient | Percent |
|---|---|
| Phosphate-demineralized whey mixture | 16.00 |
| Hydrogenated vegetable shortening | 44:20 |
| Corn syrup solids | 37.75 |
| Mono- and diglycerides | 0.50 |
| Carageenin | 0.35 |
| Dipotassium phosphate | 1.00 |
| Flavoring | 0.20 |

In the examples which follow and throughout this specification all parts and percentages given are by weight unless otherwise specified. Additionally, the following terms have the following meaning throughout:

Corn syrup solids - 24 DE - Powdered maltodextrin produced by spray drying low concentration corn syrup. The numeral letter designation refers to a 24 Dextrose equivalent.

Caraqeenin is a gum extracted from red seaweed (Irish Moss).

Emulsifier - In each instance the emulsifier used was a mixture of mono- and diglycerides of the fat acids containing approximately 40 percent monoglyceride.

Vegetable shortening - Hydrogenated vegetable oil.

It will be noted that in the various nonbutterfat dairy products set forth herein when the whey-phosphate mixture of this invention is used, the sugar or corn syrup solids must be adjusted. This adjustment is by reduction in amount necessary and provides a savings.

Example 1

Uniform dry mixtures of whey solids and certain phosphates were prepared by placing the dry powders in a plastic bag and shaking until uniform mixtures were obtained.

Two types of commercial dry whey were employed. These wheys had the approximate compositions as follows:

| Component | % By Weight | |
|---|---|---|
| | W–1 | W–2 |
| Moisture | 4.5 | 3.0 |
| Lactose | 73.0 | 64.0 |
| Fat | 1.0 | 0.5 |
| Minerals | 9.0 | 2.5 |
| Protein | 12.5 | 30.0 |

Phosphates evaluated were as follows:

| Phosphate No. | Phosphate |
|---|---|
| 1 | Insoluble metaphosphate |
| 2 | Monosodium phosphate |

Dry mixtures of the phosphate to be evaluated and whey were utilized in a ratio of approximately 3:1 protein to phosphate by weight. This dry blend was used to prepare liquid coffee whiteners having the following formulation:

| Ingredient | Amount |
|---|---|
| *Demineralized whey-phosphate blend | 4.18 |
| corn syrup solids | 8.60 |
| Vegetable shortening | 10.00 |
| Dipotassium phosphate | 1.00 |
| Stabilizers, gums and emulsifiers | 0.25 |
| Flavoring | As needed |
| Water | As needed to bring to 100% |

*Insoluble metaphosphate blend consisted of 3.80 percent demineralized whey and 0.38 percent phosphate Monosodium phosphate consisted of 3.80 percent demineralized whey and 0.45 percent phosphate Both the control and test formulations were prepared as follows:
1. The sodium caseinate or whey-phosphate ingredient was blended with the corn syrup solids, and carageenin.
2. The dipotassium phosphate buffer was dissolved in the water.
3. The blended dry ingredients were slowly added with mixing sufficient to thoroughly disperse them in the water.
4. The shortening was added.
5. The mixture was heated with constant rapid stirring in a steam jacketed kettle to 160° F.
6. The emulsifier was added and permitted to melt.
7. The solution was then homogenized at a temperature of 160° F. in a two-stage homogenizer at 2500/500 p.s.i.
8. The homogenized mixture was cooled to a temperature of 35° to 40° F. and thereafter permitted to "age" overnight at refrigerator temperatures before evaluation (approximately 40° C.).

9. When dry compositions are desired, the liquid composition is dried by such means as spray drying. Evaluation:

Control with sodium caseinate was normal in all characteristics. No separation of the emulsion occurred during overnight aging. The viscosity, as measured on a Brookfield model HAF viscometer spindle No. 1 at 10 r.p.m. was about 70 c.p.s. No fat droplets appeared when added to coffee at 180° F.

In respect to the test formulations, these were considered successful if they did not exhibit separation after overnight aging, they did not "feather" on addition to hot coffee *and* if no fat droplets appeared on the surface of the hot coffee. If any of these detrimental properties were exhibited, the sample was designated a failure.

The table which follows sets forth the results of these tests in both instant and regular coffee heated to a temperature of from about 175° F. to about 180° F. The pH of regular coffee used was 5.0–5.08. The pH of instant coffee was 5.01–5.20.

TABLE II

| Whiteners Prepared with | Coffee Regular | Instant |
| --- | --- | --- |
| a. W–1 (No phosphate) Control | – | – |
| Sodium Caseinate Control | + | + |
| c. W–2 Control (No Phosphate) | – | – |
| d. W–1 + Phosphate No. 1 | – | – |
| e. W–1 + Phosphate No 2 | – | – |
| f. W–2 + Phosphate No 1 | + | + |
| g. W–2 + Phosphate No 2 | + | + |
| (+) Designates acceptable performance | | |
| (–) Designates failure | | |

The following description sets forth in complete detail several other nonbutterfat dairy products:

Whipped Topping Bases

Whipped toppings for desserts have been utilized in commercial bakeries for some time; it was not, however, until the advent of the commercial aerosol can that these toppings attained widespread home use. Sodium caseinate is conventionally utilized in the preparation of the whipped topping bases utilized in both the commercial toppings, liquid and dry, as well as the aerosol can type. These toppings are another example of nonbutterfat dairy products made without sacrifice of flavor or aesthetic appearance, in a potential per capita availability greater than natural butterfat containing commodities. Within the provisions of this invention, it has been found that the sodium caseinate can be replaced totally or partially on a protein basis in whipped topping bases to provide equal or superior results. Sodium caseinate is utilized to fulfill the same function here as in coffee whiteners, i.e., to bind water and encapsulate the oil or fat droplets thereby stabilizing the emulsion and stabilizing the form eventually produced. Sodium caseinate is normally used in these compositions in an amount of from about 0.5 percent to about 10 percent by weight.

Representative formulations of both liquid and dry whipped topping bases are set forth below showing relative ranges of ingredients.

Whipped Toppings, Liquid

| Ingredients | % (Range) |
| --- | --- |
| Sodium caseinate or | 0.5–5.0 |
| Phosphate-demineralized whey mixture | 1.0–10.0 |
| Sugar | 0–15.0 |
| Corn syrup solids | 0–15.0 |
| (Adjusted for phosphate-demineralized whey mixture) | 0–12.0 |
| Vegetable shortening | 20.0–40.0 |
| Stabilizer and emulsifiers | 0.2–5.0 |
| Flavor and color | As needed |
| Water | To bring to 100% |

Whipped Toppings, Dry

| Ingredients | % (Range) |
| --- | --- |
| Sodium caseinate or | 3.0–10.0 |
| Phosphate-demineralized whey mixture | 6.0–20.0 |
| Vegetable shortening | 50.0–70.0 |
| Sugar | 0–20.0 |
| Corn syrup solids | 0–20.0 |
| (Adjusted for phosphate-demineralized whey mixture) | 0–7.0 |
| Stabilizers, emulsifiers, buffers, flavor, color | 0–15.0 |

The phosphate-demineralized whey mixture of this invention can be used to replace sodium caseinate totally or in part in these formulations.

The sodium caseinate, or demineralized whey-phosphate mixture, is blended with the sugar and stabilizer. The water is placed in a steam jacketed kettle and the dry ingredients are added. The mixture is heated to a temperature of 120° F. The shortening and emulsifiers are melted together and added to the water suspension and the combined mixture is heated to a temperature of 160° F. with stirring. The hot solution is homogenized in a two-stage homogenizer at 1500/500 p.s.i. The homogenized mixture is cooled to a temperature of 35° to 40° F. and aged overnight at this temperature. The dry composition can be prepared from the liquid composition by conventional drying techniques such as spray drying.

Frozen Desserts

Another area where nonbutterfat dairy products have received public acceptance is in the area of frozen desserts such as the mellorines and "milk-type" sherberts. In these compositions sodium caseinate is normally used to bind water, encapsulate fat droplets, and stabilize air blended into the mixture. It also serves to inhibit churning. Sodium caseinate is normally used in the formulations of such frozen desserts in amounts of from about 0.1 to 5 percent by weight total. It has been found that the sodium caseinate in such formulations can be partially or totally replaced by the demineralized whey-phosphate mixture of this invention to give equivalent or superior results.

Set forth below is a general formulation of such frozen desserts showing the percentage range of the ingredients used.

Frozen Desserts—Mellorines, Ice Milks, etc.

| Ingredients | % (Range) |
| --- | --- |
| Sodium caseinate or | 0.5–5.0 |
| Phosphate-demineralized whey mixture | 1.0–10.0 |
| Sugar | 0–25.0 |
| Corn syrup solids | 0–25.0 |
| (Adjusted for phosphate-demineralized whey mixture) | 0–20.0 |
| Vegetable shortening | 5.0–15.0 |
| Stabilizer and emulsifiers | 0.1–3.0 |
| Flavoring, color, salt | As needed |
| Water | To bring to 100% |

The sodium caseinate or the demineralized whey-phosphate mixture of this invention is blended with the sugar and stabilizer. The water is placed in a stem jacketed kettle and the dry ingredients are added with stirring. While stirring, the corn syrup solids are added and stirred, followed by the addition of the shortening, emulsifier and salt. The mixture is heated in the kettle to a temperature of 160° F. The hot solution is homogenized in a two-stage homogenizer at 2500/500 p.s.o. The homogenized liquid is cooled to a temperature of 35° to 40° F. and aged overnight at this temperature. The aged solution is frozen in a conventional commercial ice cream freezer at 20°–10° F. for a period of about 12 hours.

Imitation Sour Cream

A general formulation for imitation sour cream is as follows:

Imitation Sour Creams

| Ingredients | % (Range) |
| --- | --- |
| Sodium caseinate or | 0.5–5.0 |
| Phosphate-demineralized whey mixture | 1.0–10.0 |
| Vegetable shortening | 10.0–25.0 |
| Sugar and/or corn syrup solids | 5.0–15.0 |
| (Adjusted for phosphate-demineralized whey mixture) | 3.5–12.0 |
| Stabilizers and emulsifiers | 0.1–2.0 |
| Flavor and color | As needed |
| Water | To bring to 100% |

This formulation is prepared by the the following procedure:

Procedure

Heat water to 90°–110° F.

Add sodium caseinate or phosphate-demineralized whey mixture and stabilizer. Mix to dissolve.

Add shortening and emulsifier.

Pasteurize with stirring at 165° F. for 30 minutes.

Homogenize twice at 2500 p.s.i. (one stage only), keeping temperature above 160° E. during the two homogenization steps.

Cool mix to 72° F. and add the culture to be used (3percent buttermilk or a commercial starter, following manufacturer's directions). Maintain at 72° F. for ripening until acidity reaches 0.8percent (18–20 hours). Cool to 35°–40° F.

Imitation Cream Cheese

Sodium caseinate is an effective ingredient in the formulation of imitation cream cheese. Demineralized whey-phosphate mixture is an effective replacement for the sodium caseinate in whole or part.

A typical general and specific formulation for imitation cream cheese is set forth below:

Imitation Cream Cheese

| Ingredients | % (Range) |
| --- | --- |
| Sodium caseinate or | 2.3–23.0 |
| Phosphate-demineralized whey mixture | 1.0–10.0 |
| Sugar or corn syrup solids | 2.3–23.0 |
| (Adjusted for phosphate-demineralized whey mixture) | 3.5–12.0 |
| Vegetable shortening | 15.0–40.0 |
| Stabilizer and emulsifiers | 0.1–5.0 |
| Flavorings, color | As needed |
| Water | To bring to 100% |

Imitation Cream Cheese

| Ingredients | Percent |
| --- | --- |
| Phosphate-demineralized whey mixture | 4.18 |
| Corn syrup solids | 4.82 |
| Salt | 0.15 |
| **Stabilizer and emulsifier | 2.55 |
| Vegetable shortening | 25.00 |
| Flavored acid | 0.85 |
| Water | 62.45 |

The phosphate-whey mixtures of this invention can similarly effectively replace sodium caseinate in baby formulas, cream pie bases, cocoa drinks, "Instant Breakfasts", and process cheese as well as in nutrient application for soup and baby foods.

The vegetable shortening used in the formulations above and throughout the specification are hydrogenated vegetable oils. Such shortening materials are made from many oils, some being mixtures of such oils, all of which are well known in the art. Exemplary of such oils are soy bean oil, corn oil, coconut oil, peanut oil, safflower seed oil and the like. It is, or course, understood that animal fats such as those which are conventionally used as shortenings such as, for example, lard, can be used herein.

Emulsifying agents used in the formulations of this invention are preferably the mono- and diglycerides of the fat acids usually in admixture. However, any other food grade emulsifier can be used.

Similarly, stabilizers other than carageenin such as tragacanth, guar, carboxymethyl cellulose and the like can be used as stabilizers.

Corn syrup solids can be replaced with any other dextrose material which provides equivalent results.

Natural and artificial sweeteners such as honey, and the cyclamates can be used in place of sugar where desired.

Similarly, dipotassium phosphate is set forth herein as a buffer material. Other equivalent food grade buffer materials can be used, such as sodium phosphate and the like.

In any of the compositions of this invention such flavorings as are normally used in the art can be similarly used herein.

It is another embodiment of this invention that the whey-phosphate mixtures described above can be prepared in combination with the oils and fats also defined above as shortenings. As indicated, vegetable shortenings are preferred in such use. Since many of ultimate compositions in which the whey-phosphate compositions of this invention are employed also containing shortening, it has been found advantageous to prepare such compositions as such. Accordingly, compositions of demineralized, dry whey solids and either monosodium phosphate or insoluble metaphosphate have been blended with shortening and have been found to function when employed in such nonbutterfat dairy products as coffee whiteners. In these compositions, the whey-phosphate components are employed in the same ratios and amounts as are established above. The demineralized whey-phosphate mixture is generally employed in an amount of from about 20 to about 110 parts by weight per 110 parts by weight shortening, although amounts of from about 50 to about 80 parts have been found to be preferred for most applications. The demineralized whey-phosphate shortening composition is employed in the preparation of nonbutterfat dairy products generally in an amount of from about 10 to about 20 percent based on the total weight of the nonbutterfat dairy compositions.

Clearly, many variations and modifications are within the scope and spirit of this invention and therefore no unnecessary limitations should be implied from the foregoing specification.

What is claimed is:

1. A food additive composition consisting essentially of dry particulate mixture of demineralized dry whey solids having a mineral content no greater than 5.0 percent by weight of the total dry whey and from about one to about 40 percent, by weight, based on the percent whey protein of a phosphate selected from monosodium phosphate or insoluble metaphosphate.

2. The composition of claim 1 wherein the phosphate is monosodium phosphate.

3. The composition of claim 1 wherein the phosphate is insoluble metaphosphate having an average particle size of no greater than 44 microns.

4. The composition of claim 1 wherein the demineralized dry whey has a mineral content of from about 1 percent to about 5.0 percent by weight.

5. The composition of claim 1 wherein the demineralized dry whey has a mineral content of from about 2 percent to about 4 percent by weight.

6. The composition of claim 1 wherein the phosphate is present in an amount of from about 10 percent to about 40 percent.

7. The composition of claim 1 wherein the phosphate is present in an amount of from about 25 percent to about 35 percent by weight.

8. A food composition containing from about 0.05 to about 15 percent by weight of the composition of claim 1.

9. A food composition containing from about 0.05 to about 15 percent by weight of the composition of claim 12.

10. The composition of claim 9 wherein the food composition is a coffee whitener.

11. A food composition containing from about 0.05 percent to about 15 percent by weight of the composition of claim 3.

12. A composition containing from about 20 to about 110 parts by weight of the dry, particulate mixture of claim 1 TO 100 parts by weight shortening.

13. A composition containing from about 50 to about 80 parts by weight of the composition of claim 2 to 100 parts by weight shortening.

14. A composition comprising from about 50 to about 80 parts by weight of the composition of claim 3 to about 100 parts by weight shortening.

15. A nonbutterfat dairy composition normally containing sodium caseinate selected from the group consisting of coffee whiteners, whipped toppings, mellorines, frozen desserts, puddings, custards, frozen cream pies, processed cheese, imitation sour creams, snack dips, baby food, instant breakfast, filled milk, and imitation milk where from about 1 percent to 100 percent by weight protein basis of the sodium caseinate has been replaced by the composition of claim 1.

16. The composition of claim 15 wherein the nonbutterfat dairy product is a coffee whitener.

17. A method for providing a food composition normally containing sodium caseinate which comprises replacing at least a part of the sodium caseinate requirement of said food composition with a dry particulate mixture of demineralized dry whey solids having a mineral content no greater than 5 percent by weight of the total dry whey, and from 1 percent to about 40 percent by weight based on the percent whey protein of a phosphate selected from monosodium phosphate or insoluble metaphosphate, said replacement being in an amount sufficient to provide the functional properties of said replaced sodium caseinate.

18. The method as recited in claim 17 wherein the demineralized whey has a mineral content of from about 2 percent to about 4 percent by weight.

19. The method as recited in claim 17 wherein said phosphate is monosodium phosphate.

20. The method as recited in claim 17 wherein the phosphate is insoluble metaphosphate having an average particle size of a no greater than 44 micron.

21. The method as recited in claim 17 wherein said food composition is selected from the group consisting of coffee whiteners, whipped toppings, mellorines, frozen desserts, puddings, custards, frozen cream pies, processed cheese, imitation sourcreams, snack dips, baby food, instant breakfast, filled milk, and imitation milk.

* * * * *

PO-1050
(5/69)

UNITED STATES PATENT OFFICE
CERTIFICATE OF CORRECTION

Patent No. 3,615,662      Dated October 26, 1971

Inventor(s) Rudolph H. Ellinger and Mark G. Schwartz

It is certified that error appears in the above-identified patent and that said Letters Patent are hereby corrected as shown below:

Col. 1, line 58, the numbers "1" to about "5" percent should read -- 0 -- to about -- 5.0 -- percent. Col. 2, line 51, the word "not" should read -- no --; col. 2, line 65, the word "given" should read -- in --. Col. 3, line 13, the word "is" should read -- it --; col. 3, line 24, after the word "metaphosphate", insert -- it --. Col. 4, line 69, the word "spoilage" should read -- spillage --; col. 4, line 71, the word "the" preventing should read -- thus -- preventing. Col. 5, line 75, the word "Caraqeenin" should read -- Carageenin --; col. 5, line 2, after the word "percent" insert -- based --. Columns 3 and 4, TABLE I, the last column the word "tyrosinc" should read -- Tyrosinc --. Col. 7, line 17, the number "5.0" should read -- 5.3 --; col. 7, TABLE II, the fourth line, insert -- b. --; col. 7, line 55, the word "form" should read -- foam --. Col. 8, line 71, the word "p.s.o." should read -- p.s.i. --; col. 8, line 75, the number "20°-10°F." should read -- 20°-25° F. -- and after the number "20°-25° F." insert -- and then permitted to harden at a temperature of about -10° F. --. Col. 9, line 29, the word "160° E" should read -- 160° F. --; col. 9, the second formulation, sixth line, the mark "**" should be deleted. Col. 10, line 43, the number "110 parts by weight shortening," should read -- 100 parts by weight shortening --; Claim 1, line 1, after the word "of" insert -- a --. Claim 9 change dependency to Claim 2; Claim 10, insert -- food -- before "composition"; Claim 12, "TO" should read -- to --; Claim 15, "nonbutterfat" should read -- non-butterfat --; Claim 16, "nonbutterfat" should read -- non-butterfat --; Claim 17, line 7, "greater than 5" should read -- greater than 5.0 --.

Signed and sealed this 18th day of April 1972.

(SEAL)
Attest:

EDWARD M. FLETCHER, JR.
Attesting Officer

ROBERT GOTTSCHALK
Commissioner of Patents